United States Patent

[11] 3,608,982

| [72] | Inventors | Masami Inada;<br>Tatsuo Hayashi; Katuki Takayama, all of Kariya-shi, Aichi-ken, Japan |
|---|---|---|
| [21] | Appl. No. | 832,600 |
| [22] | Filed | June 12, 1969 |
| [45] | Patented | Sept. 28, 1971 |
| [73] | Assignee | Aisin Seiki Company Limited<br>Asahi-machi, Kariya-shi, Aichi-ken, Japan |
| [32] | Priority | June 22, 1968 |
| [33] | | Japan |
| [31] | | 43/43534 |

[54] METHOD AND APPARATUS FOR THE CONTROL OF ANTISKID BRAKE PRESSURE
7 Claims, 2 Drawing Figs.

[52] U.S. Cl................................................. 303/21 F,
188/181 A, 303/6, 303/61
[51] Int. Cl...................................................... B60t 8/12,
B60t 13/60
[50] Field of Search........................................... 303/21, 6,
24, 61–63, 68–69; 188/181

[56] References Cited
UNITED STATES PATENTS

| 2,417,211 | 3/1947 | Newell | 303/21 |
| 3,306,677 | 2/1967 | Dewar et al. | 303/21 |
| 3,325,226 | 6/1967 | Perrino | 303/21 |
| 3,401,986 | 9/1968 | Walker et al. | 303/21 |
| 3,415,577 | 12/1968 | Walker | 303/21 |
| 3,481,653 | 12/1969 | Grancon | 303/21 |
| 3,486,800 | 12/1969 | Ayers | 303/21 |
| 3,495,882 | 2/1970 | Stelzer | 303/21 |

Primary Examiner—Milton Buchler
Assistant Examiner—John J. McLaughlin
Attorney—Sughrue, Rothwell, Mion, Zinn & Macpeak ABSTRACT: In a pneumatically servo-controlled hydraulic brake pressure control arrangement, comprising a pneumatic servo unit having two pneumatic piston chambers; a master cylinder unit operatively connected with said servo unit, on the one hand, and with hydraulic cylinder means for wheel or wheels of a powered vehicle, on the other; an air change off valve means adapted for receiving a wheel lock or lock-impending a signal from a wheel deceleration sensing means, the improvements comprise the provision of a check valve adapted for on-off controlling pneumatic flow from one of said servo piston chambers through said change off valve means, and a flow control valve adapted for throttling said flow, said check valve and said flow control valve being arranged in parallel to each other for suppressing otherwise possible excess repetition of hydraulic brake pressure increase and release in case of an abrupt and considerable application of the hydraulic braking effort.

METHOD AND APPARATUS FOR THE CONTROL OF ANTISKID BRAKE PRESSURE

This invention relates to an antiskid brake control arrangement adapted for effectively preventing vehicle skid which may frequently be encountered in case of the application of substantial braking effort upon the wheels of a powered vehicle.

With use of such conventional antiskid arrangements which are now broadly in practical use, especially in the field of automotive vehicles, it is found during the braking period that release of hydraulic brake pressure which is caused to take place with reception of an electrical signal from an antiskid sensor and reincrease of the hydraulic brake pressure which occurs by the interruption of continuance of said signal delivery which interruption is caused to take place upon the release of said hydraulic brake pressure, are repeated at a considerably high frequency, thereby inviting unpleasant shocks which may be sensed by persons who are on board of the vehicle. It is experienced further that the effective brake application for a long period is disturbed by the repeated cycle of hydraulic pressure release and reapplication which fact leads to a considerably loss of effective brake application energy.

The main object of the invention is to provide an antiskid brake pressure control arrangement adapted for obviating the above mentioned conventional drawbacks.

These and further objects, features and advantages of the invention will become more clear when read the following detailed description of the invention by reference to the accompanying drawings which constitutes a part of the present specification. In the drawing.

Figure 1:
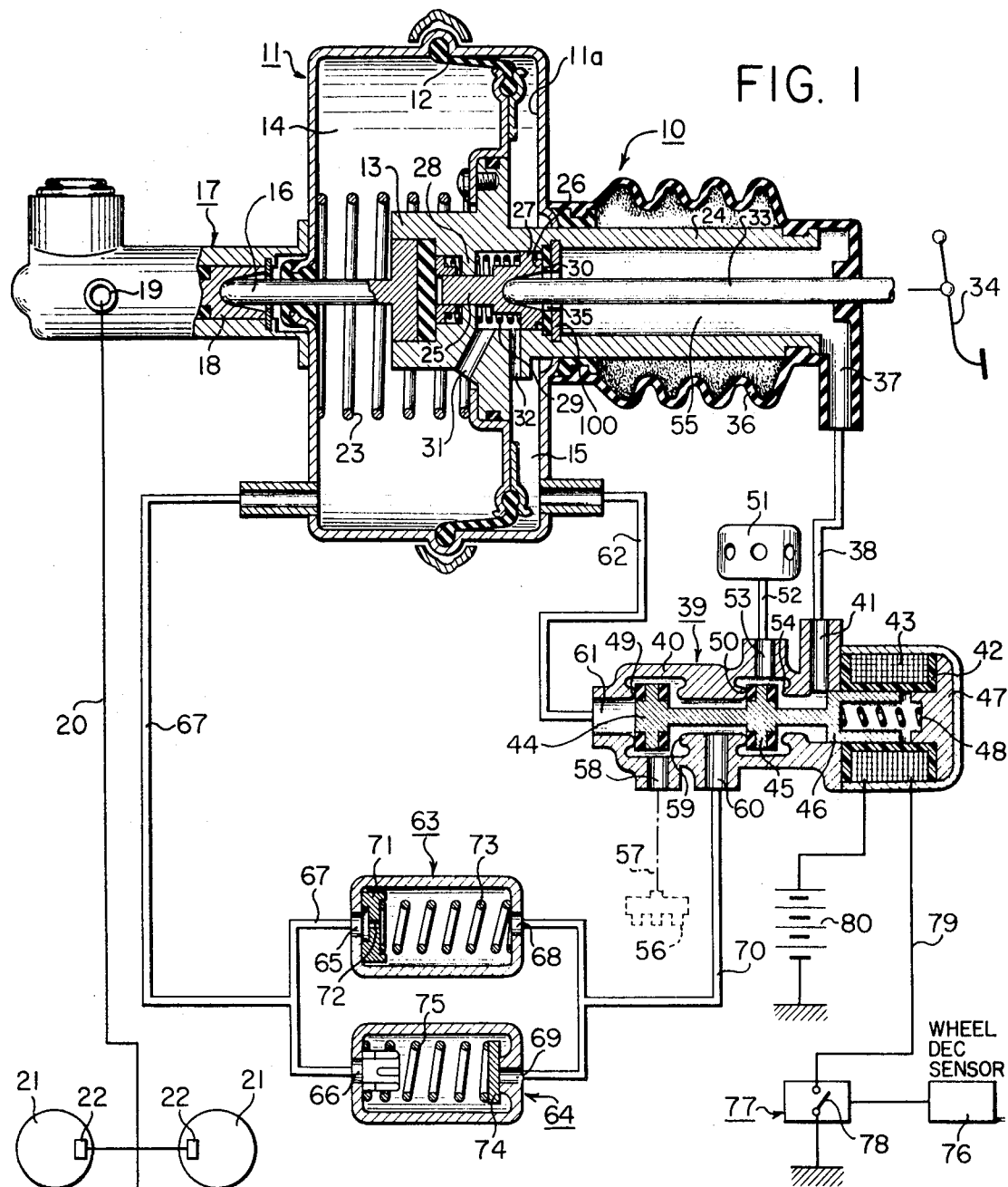
FIG. 1 is a schematic and substantially sectional view of a preferred embodiment of the present invention, together with an additional electric circuit schema necessary for better understanding of the invention.

Referring now to the accompanying drawing, especially FIG. 1 thereof, which illustrates schematically a preferred embodiment of the invention, the numeral 10 denotes generally a conventional brake booster which comprises a servo unit 11 having its interior space divided into two chambers 14 and 15 by means of a power piston 13 which is provided with a resilient diaphragm 12 having its outer peripheral edge fixedly attached to the inside cylindrical wall of the cylinder at 11a.

The numeral 16 represents a master rod which is rigidly connected with said power piston 13 and connected operatively with a conventional master piston 18 adapted for performing sliding movement within a master cylinder 17 which is rigidly connected with said servo unit 11. The master cylinder 17 is provided with an outlet port 19 which is kept in fluid connection with the hydraulic chamber, not shown, formed within the interior of said master cylinder, on the one hand, and connected through a piping 20 to a conventional hydraulic wheel cylinders 22 attached to respective automotive wheels 21, on the other hand.

A return spring 23 is inserted under compression between the left-hand wall of said servo unit 11 and the power piston 13, the latter being thus urged resiliently rightwards. In addition, the power piston is attached at its center rigidly with an opened cylinder 24 which extends axially thereof and is bored axially therethrough. A valve piston 25 is axially slidably mounted within the cylinder 24 and formed in turn with a valve seat 26. The valve piston 25 is formed into a stepped piston comprising a large-diameter part 27, while the cylinder 24 is formed with a shoulder 28. There is provided a coil spring 29 which is kept in compression between said part 27 and said shoulder 28, said spring urging the movable valve seat 26 against a resilient valve member 30 which is kept in position specifically selected within the cylinder 24 by means of a retainer ring shown at 100. Two passage bores 31 and 32 are bored through the wall of power piston 13, allowing normally fluid communication between both chambers 14 and 15. A push rod 33 is kept in pressure engagement with the right-hand end of valve piston 25, on the one hand, and mechanically connected through a suitable linkage, not shown, with a conventional foot-operated brake pedal 34 which is shown only schematically.

Valve member 30 is formed axially with a bore 35 for allowing free pass of the push rod 33, on the other hand, and fluid passage through the bore, on the other. A boot 36 encloses with ample gap the axial extension of the power piston 13, said boot being formed at its right-hand end with a passage 37 which is fluidically connected with a further passage 41 formed through the housing wall 40 of an air changeover valve 39. A bobbin 42 made of nonmagnetic material and fixedly attached to said housing 40, said bobbin being provided with a solenoid coil means 43 wound therearound. A plunger 46 slidably mounted within housing 40 is formed with vacuum valve 44 and air valve 45. Conduit 38 extends between passages 37 and 41.

A spring 48 is provided under compression between stationary mount 47 and plunger 46 which is thereby urged resiliently to move leftwards in FIG. 1. Under these normal conditions, vacuum valve 4 is kept in pressure engagement with its mating valve seat 49, and air valve 45 is kept in sealing engagement with its cooperating valve seat 50. Normally, air cleaner 51 is kept in communication through conduit 52 and passage 53, and further through the passage now formed between vacuum valve 44 and valve seat 59 with a passage 60 bored through the wall of said housing 40.

Another passage 61 of air change off valve 39 is kept in communication through conduit 62 with the right-hand chamber 15 of said servo unit 11. Flow control valve 63 and check valve 64 are arranged in parallel to each other and between servo unit 11 and valve 39. Passages 65 and 66 bored through the respective left-hand end walls of these valves 63 and 64 are kept in fluid communication through a common connecting piping 67 with the left-hand chamber 14 of servo unit 11. Passages 68 and 69 formed through the respective right-hand end walls of said both valves 63 and 64 are fluidically connected through a common piping 70 to the passage 60. A valve member 71 is positioned movably within the housing of valve 63, said valve member being formed with an axially drilled bore or orifice 72 and urged resiliently to move leftwards under the action of a spring 73, thereby the passage bore 65 being normally sealed off. Valve member 74 is positioned movably within the housing of check valve 64, and normally urged resiliently to move rightwards by a spring 75, thereby the passage bore 69 being positively sealed off.

Finally, electrical circuit means employed will be described hereinbelow:

A conventional wheel deceleration sensor 76, shown only in a block, is designed and arranged to deliver an electrical signal when the deceleration of vehicle wheel or wheels should exceed beyond a predetermined value, while a computer 77 of the regular design as adopted in the art contains an electrical switch 78 which is designed and arranged as conventionally to be closed upon delivery of a signal from the sensor 76. This switch 78 is connected through a lead 79 with one end of said solenoid coil 43, the opposite end thereof being connected with a positive side of battery 80. The negative side of the battery is earthed as shown.

The operation of the antiskid braking arrangement so far shown and described is as follows:

In case of nonbrake application, all the constituent parts are positioned relative to each other as shown in FIG. 1 and the left-hand chamber 14 is kept in communication with vacuum source in the form of the engine intake manifold shown only schematically at 56 through passages 58 and 60; conduit 70; passage 68 of flow control valve 63 and conduit 67. The right-hand chamber 15 is also kept in vacua through passages 31 and 32. Therefore, no differential pressure will act upon the power piston 13 which is therefore positioned in its right-hand extreme position under the influence of spring force at 23, as shown in FIG. 1.

When the vehicle driver depresses the brake pedal 34 for providing a regular braking effort, motion is transmitted from the pedal to push rod 33 which is thus forcibly shifted leftwards, accompanying at the same time the valve piston 25 kept in mechanical cooperation therewith.

Upon the leftward movement of valve piston 25, passage 32 is closed by the larger part 27 of the valve piston, and the hitherto established communication between the chambers 14 and 15 will thus be interrupted. By further leftwards sliding movement of valve piston 25, the atmospheric pressure prevailing in the ring space at 55 by communication through air cleaner 51; conduit 52; passage 53, conduit 38 and the like with ambient open atmosphere, will invade through passage 32 into the right-hand chamber 15, thereby a pressure differential being caused to act upon the power piston 13 which is then moved in the left-hand direction in FIG. 1 in an abrupt manner, resulting in a conventionally boosted hydraulic effect being transmitted to the wheel cylinders.

Figure 2:
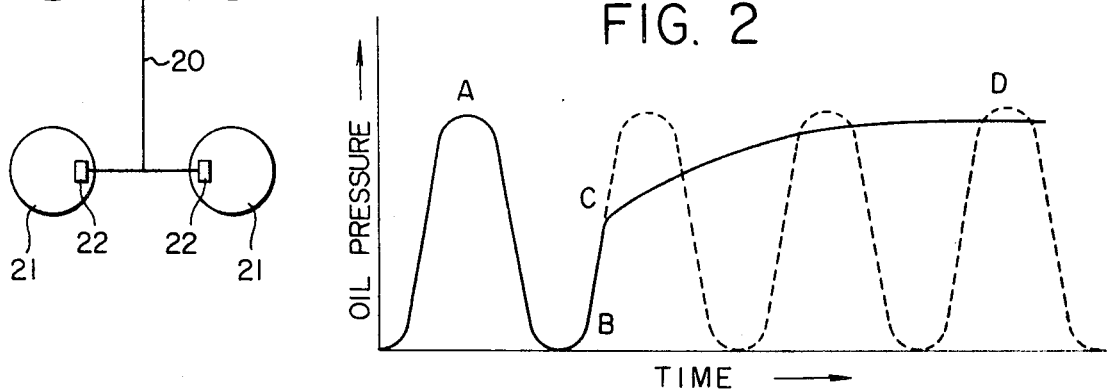
FIG. 2 is a schema of comparative performance curves representing the hydraulic brake pressure plotted against time wherein the full line curve shows the results of the invention and the dotted line represents those of a conventional comparative arrangement.

When the vehicle wheel or wheels are locked to such a degree that the sensor 76 is thereby brought into actuation and an electrical signal will be delivered therefrom and conveyed to the computer 77, resulting into closure of electrical switch 78. In this way, solenoid coil 43 is energized so as to attract the plunger 46 rightwards against the action of spring 48. Valves 44 and 45 are thus brought into tight contact with respective seats 59 and 54, and vacuum is conveyed from intake manifold 56 through passage 61 and conduit 62 to the right-hand chamber 15, while atmospheric pressure is conveyed through air cleaner 51; passage 60; conduit 70 and passage 69 of check valve 64 onto the valve member 74 which is thus urged pneumatically leftwards against the action of spring force at 75. The atmospheric pressure is conveyed therefore through valve assembly 64 through piping 67 to the left-hand chamber 14. A pneumatic pressure difference thus developed acts therefore upon power piston 13 in the reverse direction, thus the latter being urged suddenly rightwards, thereby a reduced hydraulic pressure being as conventionally supplied to wheel cylinders 22. This brake pressure reduction course is shown by a down trend curve A-B in FIG. 2.

When the wheel lock is released by the application of a reduced hydraulic brake pressure in the above mentioned sense, the delivery of electrical signal from the sensor 76 is interrupted and all the constituents will be returned to their initial position shown in FIG. 1. In this case, vacuum pressure from intake manifold 56 is conveyed through conduit 57; passage 58; valve space defined by valve 44 and valve seat 59; passage 60; conduit 70; port 68 into the interior space of valve seat 63, thereby the valve member 71 being moved rightwards against the spring force at 73; and the valve bore 65 being thus opened. Now a substantial amount of the atmospheric pressure is conveyed from left-hand chamber 14 of servo unit 11 through conduit 67 and the now opened bore 65 and so on towards the engine intake manifold 56. The air pressure prevailing in the chamber 14 will be reduced in a sudden way towards the vacuum pressure until a predetermined value is attained, whereupon the valve member 71 of flow control valve 63 will return leftwards under the influence of spring pressure 73 (see, point C, FIG. 2).

After this operating period, the air pressure in the chamber 14 is sucked through the orifice 72 of valve assembly 71 and thus throttled suddenly. This course corresponds to the gradually increasing curve C-D shown in FIG. 2.

As will be clearly understood from the foregoing, the power piston 13 will be returned rapidly in the right-hand direction from the time where the instruction signal issued from sensor 76 to a such time point where the air pressure in chamber 14 attains a predetermined value. But, the power piston will return to its starting position from the time point where, as above mentioned, the chamber pressure at 14 has attained a predetermined value, and upon closure of the valve member 63, since the pressure air under consideration will flow through the orifice 72. As a result, the hitherto reduced hydraulic brake pressure represented by the descending curve portion A-B will be rapidly increased within a certain stabilized range where no wheel lock is feared, as shown at B-C in FIG. 2.

Upon attainment of the pressure at the point C, the pressure will be increased highly gradually, as hinted at C-D.

While, with use of conventional hydraulic pressure control mechanisms, a repeated brake pressure release and increase cycle at a relatively high frequency will be brought about and severe and frequent shocks would be avoided in a highly effective manner. With use of the inventive mechanism, however, the application of an effective braking hydraulic pressure will be maintained for a considerably longer period than the case of prior art.

The embodiments of the invention in which an exclusive property or privilege is claimed are defined as follows:

1. An antiskid braking control system for a vehicle having wheel cylinders and a master cylinder fluidically connected thereto for applying hydraulic brake pressure to said wheel cylinders for braking the wheels of said vehicle comprising, servo means having two pneumatic chambers separated by a power piston for boosting hydraulic brake pressure in said master cylinder, sensing means producing a first signal when said vehicle wheels are locked and a second signal when said wheels are released, control means responsive to said sensing means for controlling said servo means and including valve means operable to control the pressure differential in said chambers so as to move said power piston in a direction in which hydraulic pressure is decreased in response to said first signal and to move said power piston in a direction in which hydraulic brake pressure is increased in response to said second signal, and pressure control means adapted to permit a rapid decrease of pressure in one of said chambers upon reception of said second signal to allow a rapid increase in brake pressure until a predetermined pressure differential in said chambers is achieved and subsequently permitting a further gradual decrease in pressure to allow a gradual increase in brake pressure upon reapplication of said brakes.

2. An antiskid braking control system as set forth in claim 1 wherein said valve means comprises, a vacuum valve for connecting the other of said chambers with a vacuum source responsive to said first signal and for connecting said pressure control means with said vacuum source responsive to said second signal, and an air valve for connecting said pressure control means with an atmospheric pressure source responsive to said first signal and connecting said servo means with said atmospheric pressure source responsive to said second signal.

3. An antiskid braking control system as set forth in claim 1 wherein said servo means further comprises passage means connected between said two chambers for establishing pneumatic communication therebetween, valve means responsive to foot pressure exerted upon a brake pedal for on-off control of said passage means and for movement of said power piston, spring means for urging said power piston in opposition to said foot pressure and passage mans for connecting one of said two chambers with said pressure control means and connecting the other of said chambers with said control means.

4. An antiskid braking control system as set forth in claim 3 wherein said pressure control means comprises a check valve for checking pneumatic flow from said one chamber to said control means and a flow control valve for controlling said pneumatic flow.

5. An antiskid braking control system as set forth in claim 4 wherein said check valve and said flow control valve are arranged in parallel to each other between said one chamber and said control means.

6. An antiskid braking control system as set forth in claim 4 wherein said flow control valve comprises a valve member adapted for on-off control of fluid communication between said one chamber and said control means, a spring urging said valve member towards its closed position, and an orifice provided in said valve member.

7. An antiskid braking control system as set forth in claim 1 wherein said servo means further comprises passage means connected between said two chambers for establishing pneumatic communication therebetween, valve means responsive to foot pressure exerted upon a brake pedal for on-off control of said passage means and for moving said power piston, spring means for urging said power piston in opposition to said foot pressure, and passage means for connecting one of said two chambers with said pressure control means and connecting the other chamber with said control means, said valve means further comprising a vacuum valve for connecting the other of said chambers with a vacuum source responsive to said first signal and for connecting said pressure control means with said vacuum source responsive to said second signal, and an air valve for connecting said pressure control means with an atmospheric pressure source responsive to said first signal and connecting said servo means with said atmospheric pressure source responsive to said second signal, and wherein said pressure control means comprises a check valve for checking pneumatic flow from one chamber to said control means and a flow control valve for controlling said pneumatic flow.